Sept. 29, 1942. E. W. JOHNSON 2,297,562
SHOCK ABSORBER
Filed April 18, 1941 6 Sheets-Sheet 1

Ernest W. Johnson
By
Watson, Cole, Grindle & Watson
ATTYS

Sept. 29, 1942.   E. W. JOHNSON   2,297,562
SHOCK ABSORBER
Filed April 18, 1941   6 Sheets-Sheet 2
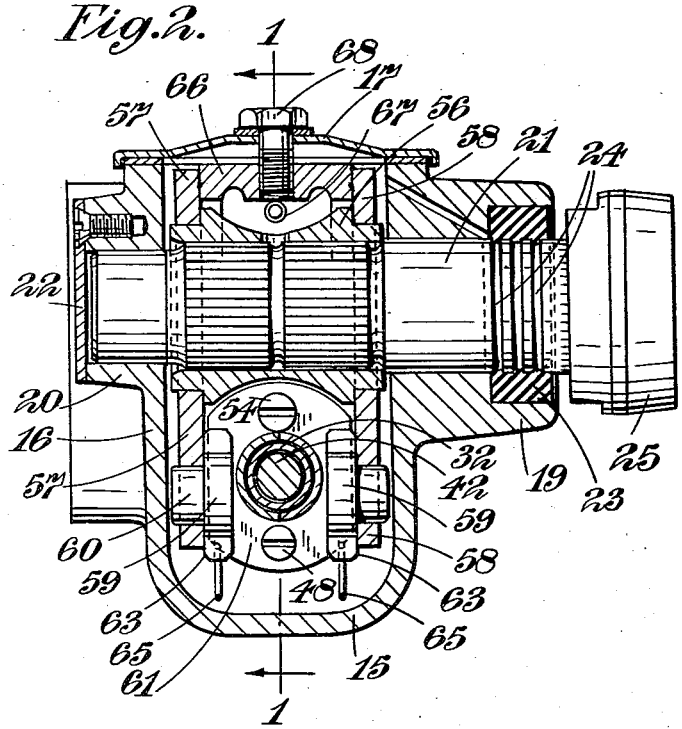
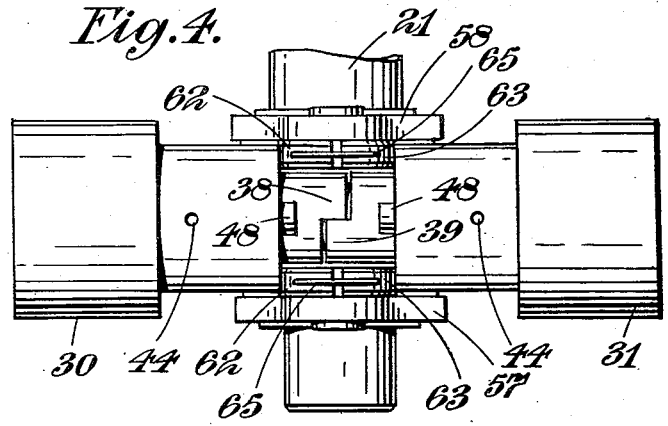
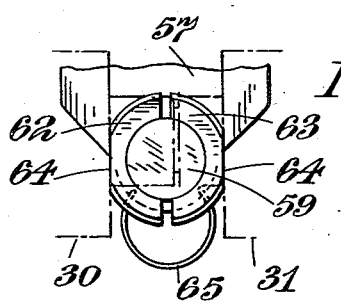

Sept. 29, 1942. E. W. JOHNSON 2,297,562
SHOCK ABSORBER
Filed April 18, 1941 6 Sheets-Sheet 3
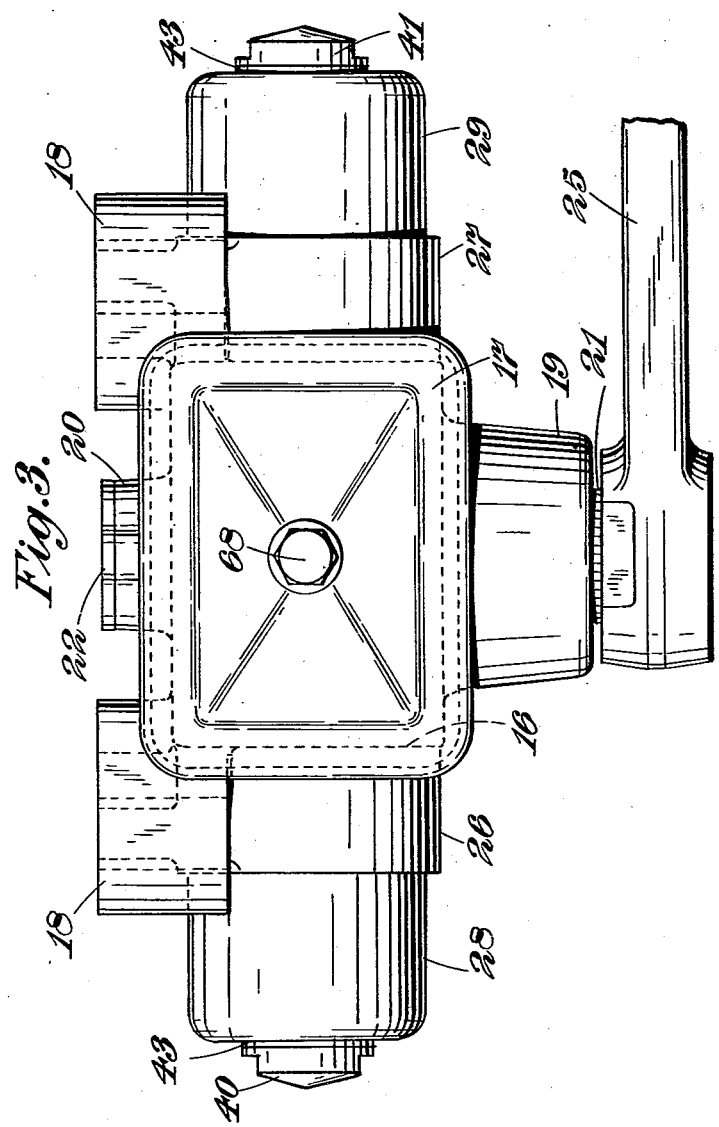

Sept. 29, 1942.　　　E. W. JOHNSON　　　2,297,562
SHOCK ABSORBER
Filed April 18, 1941　　　6 Sheets-Sheet 4
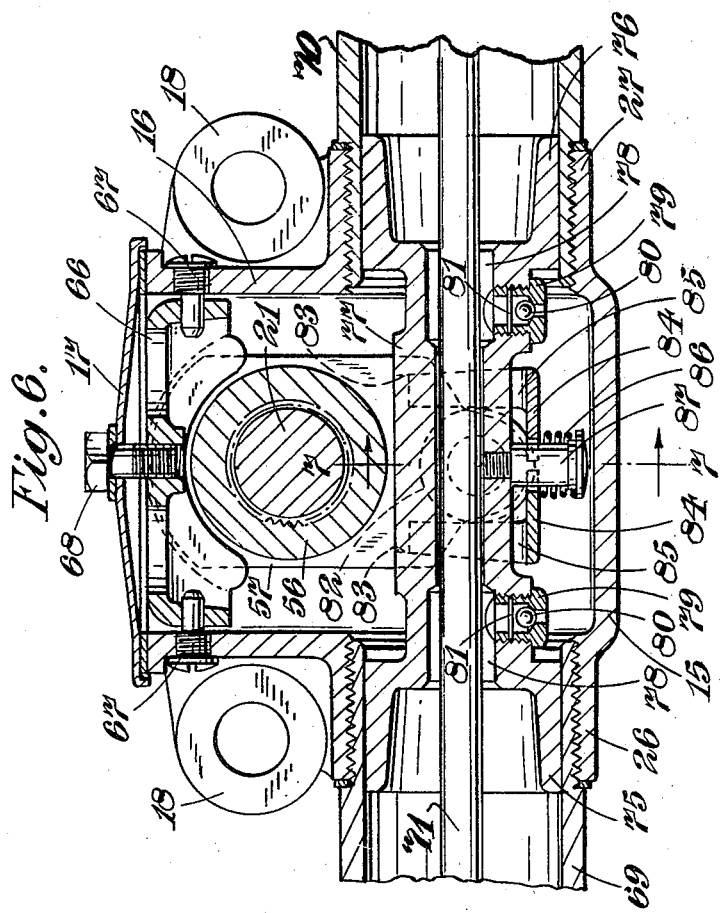

Sept. 29, 1942.  E. W. JOHNSON  2,297,562
SHOCK ABSORBER
Filed April 18, 1941  6 Sheets-Sheet 6
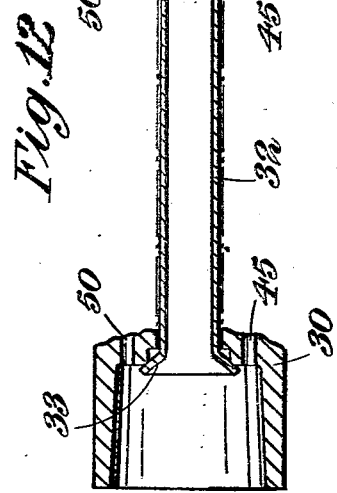
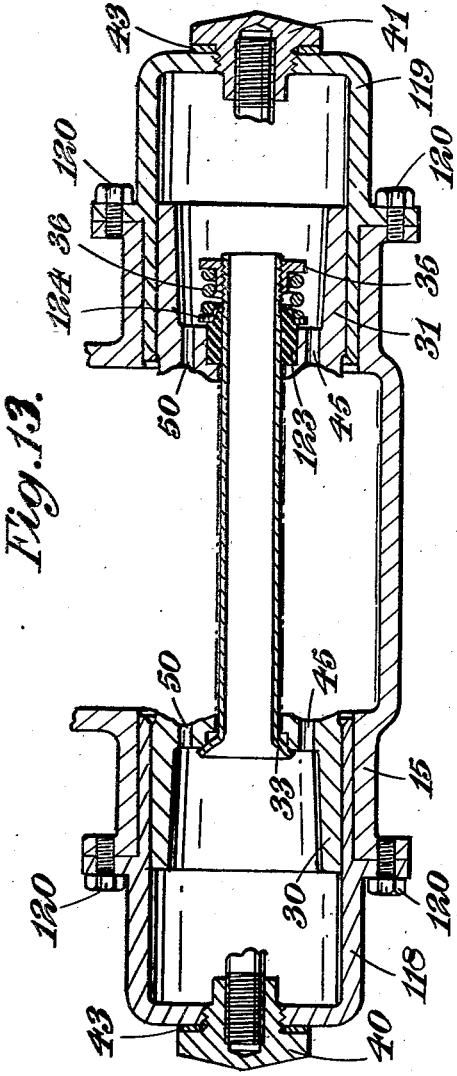
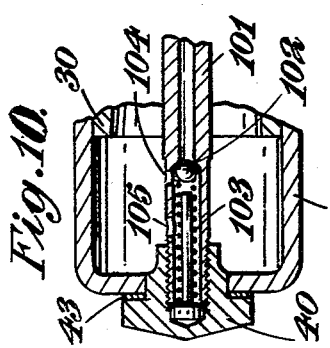
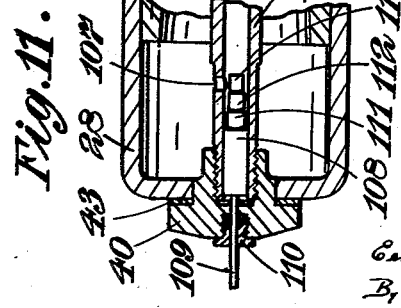

Patented Sept. 29, 1942

2,297,562

UNITED STATES PATENT OFFICE 2,297,562

SHOCK ABSORBER

Ernest William Johnson, Birmingham, England, assignor of one-half to Vanderwell Products Limited, London, England, a British company Application April 18, 1941, Serial No. 389,249
In Great Britain March 13, 1940

15 Claims. (Cl. 188—88)

This invention is for improvements in or relating to shock absorbers and has for one of its objects to provide a construction suitable for mass production with such a degree of accuracy that there will usually be no need for the individual adjustment of the shock absorbers after the parts have been assembled.

The invention is concerned with shock absorbers of the type in which fluid friction is employed for damping and the fluid is forced by the movable wall of a fluid-container from that fluid-container into another fluid-container through a restricted passage which affords resistance to the flow of fluid and is provided between the opposed surfaces of a perforation in a piston, which constitutes the said movable wall, and a metering rod which reaches into said perforation in such manner that the piston reciprocates along the metering rod.

The shock absorber will usually be made up in double-acting form, in which case it may have two pistons, one in each fluid-container, which pistons reciprocate along a single metering rod and force the fluid through the same restricted passage.

The metering rod is enclosed within the casing of the shock absorber and it is an object of the present invention to relieve the casing from endwise stress by providing a detachable cap opposite each end of the metering rod and securing both of said caps to the metering rod.

Where there is interposed between the metering rod and the perforation in the piston, a sleeve which moves with the piston and affords between it and the metering rod the said restricted passage, it is an object of the invention to preclude the passage of fluid between the sleeve and the piston by providing a seal.

In the aforesaid type of shock absorber, a rock shaft which transmits the shock and the damping effort is coupled to the piston by a rock arm which engages transverse guides so arranged in the piston rod as to maintain the engagement during the rotary movement of the arm and the corresponding reciprocatory movement of the piston. It is an object of the invention to take up wear between the rock arm and guides by interposing spring pressed bearing members between these parts.

It is also an object of the invention to enable a double-acting shock absorber to be utilised as a single-acting shock absorber or to enable the value of the shock absorber in one direction to be varied with respect to the value in the other direction.

For a more complete understanding of the invention, there will now be described, by way of example only and with reference to the accompanying drawings, various constructional forms of shock absorber according to the invention. It is to be understood, however, that the invention is not restricted to the precise constructional details set forth.

In these drawings:

Figure 2 is a vertical cross-section on the line 2—2 of Figure 1;

Figure 3 is a plan of the construction shown in Figures 1 and 2;

Figure 4 is an under-plan of the pistons and certain associated parts shown in Figures 1 and 2;

Figure 5 is a detail elevation of the bearing members and certain associated parts shown in Figures 1, 2 and 4;

Figure 6 is a sectional elevation, corresponding to Figure 1, but showing a modified construction of double-acting shock absorber;

Figure 10 is a fragmentary sectional view of a shock absorber according to Figure 1 but modified to be single-acting;

Figure 11 is a view corresponding to Figure 10 but showing a double-acting shock absorber whereof the operative value in one direction is adjustable;

Figure 12 is a fragmentary sectional view corresponding to part of Figure 1 but showing a modified construction, and Fig. 13 is another fragmentary sectional view corresponding to part of Figure 1 but showing a different modified construction.

Like reference numerals indicate like parts throughout the drawings.

Figure 1:
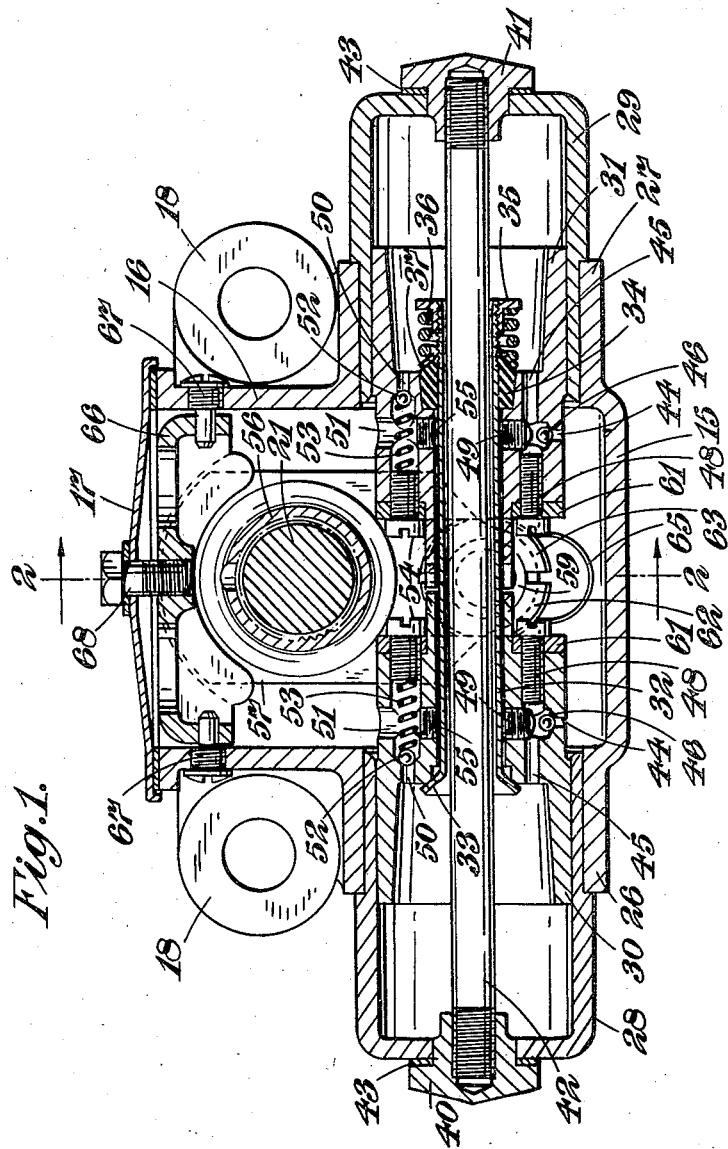
Figure 1 is a sectional elevation, on the line 1—1 of Figure 2, showing a double-acting shock absorber according to the invention.

Referring firstly to Figures 1 to 5, the double-acting shock absorber therein shown comprises a casing 15 which will usually be made of metal but in some circumstances may be made of plastic moulded material such for instance as that sold under the registered trade-mark "Bakelite." This casing is not subjected to any pressure from the shock absorbing fluid and thus it is not essential to employ metal in its construction. The casing 15 has an upstanding centre barrel 16 of generally rectangular cross-section which is closed at the bottom and provided at the top with a cover plate 17. At its sides it has lugs 18 to receive securing bolts whereby it may be mounted in place. Also projecting from the barrel 16 are bosses 19 and 20 which constitute bearings for a rock shaft 21. The end of the bore in the boss 20 is closed by a detachable cap 22 and the outer end of the bore in the boss 19 is enlarged to receive a rubber or like sealing bush 23 which is forced into position and by virtue of its greater volume, when free, than the space occupied when in position makes sealing engagement due to its resilience with grooves 24 in the rock shaft 21. Outside the casing 15 the rock shaft 21 has splined or otherwise secured to it one end of an arm 25. The other end (not shown) of this arm is connected to one of the parts to be controlled by the shock absorber and the lugs 18 are bolted to the other of said parts.

The casing 15 also has two aligned bosses 26 and 27 which are bored to receive cylinders 28 and 29 constituting the fluid containers. The cylinders 28 and 29 will usually be made of metal. Their interiors are bored to receive pistons 30 and 31 which may be made of metal or of moulded plastic material such for instance as that sold under the registered trade-mark "Bakelite." The pistons are separate from each other and are received upon a sleeve 32. The pistons are not necessarily a close fit upon the exterior of the sleeve 32 but a close joint or seal is made between each piston and the appropriate end of the sleeve. Towards the left-hand end of Figure 1 the end of the sleeve is conically or spherically enlarged at 33 to seat against the piston 30. The other piston 31 is conically bored to receive a gland or packing 34 the outer end of which is conical. The projecting end of the sleeve 32 is screwthreaded to receive a nut 35 between the head of which and the end of the packing 34 there are housed a spring 36 and a conical washer 37 which latter corresponds in shape to the projecting end of the packing 34. It will be seen that the spring 36 will not only force the packing into close contact with the sleeve 32, due to the conical shape of the washer 37 and the conical shape of the bore in the piston 31 which receives the packing 34, but will also draw the enlarged end 33 into close contact with the piston 30 and press the two pistons towards each other.

In order to prevent the pistons 30 and 31 from turning relatively to each other about the sleeve 32, the adjacent ends of the pistons are formed with interlocking shoulders 38 and 39 as shown in Figure 4.

The outer ends of the cylinders 28 and 29 are inturned and bored to receive end caps 40 and 41, into both of which a metering rod 42 is screwed. Thus the rod 42 relieves the casing 15 from endwise stress. Washers 43 are provided to ensure that the end caps 40 and 41 shall make a tight joint with the cylinders 28 and 29. When the end caps 40 and 41 are screwed home on the metering rod the latter serves to hold the cylinders 28 and 29 in place in the casing 15. The metering rod 42 reaches right through the interior of the sleeve 32 so that there is a nested arrangement consisting of the metering rod 42, the sleeve 32 and the pistons 30 and 31 which is very compact. The restricted passage through which the damping fluid passes between the cylinders 28 and 29 lies between the opposed surfaces of the sleeve 32 and the metering rod 42. The metering rod can be of substantial diameter, for instance 0.3", and the bore of the sleeve correspondingly larger. Dimensions of this character can be readily worked to in manufacture, and if there is any error, its effect on the area of the restricted passage will be relatively less than would be the case, for example, if a fine needle valve were employed to control the passage of the fluid. The clearance between the metering rod and the sleeve can be chosen according to circumstances and in some cases a suitable difference in diameter is .005–.006". The choice in the amount of clearance may be influenced by the length of the sleeve 32.

The centre barrel 16 of the casing constitutes a recuperator chamber from which there is made up any loss of damping fluid from the two cylinders. To permit this recuperation, each piston is formed with ducts 44 and 45 through which communication may be established between the recuperator chamber and the interior of the cylinders. The duct 44 is controlled by a non-return valve 46 so that fluid may be drawn from the recuperator chamber into the cylinders if a vacuum develops in the latter, but cannot pass in the reverse direction. The valve 46 is prevented from undue displacement by a screw plug 49.

The centre barrel 16 of the casing constitutes a recuperator chamber from which there is made up any loss of damping fluid from the two cylinders. To permit this recuperation, each piston is formed with ducts 44 and 45 through which communication may be established between the recuperator chamber and the interior of the cylinders. The duct 44 is controlled by a non-return valve 46 so that fluid may be drawn from the recuperator chamber into the cylinders if a vacuum develops in the latter, but cannot pass in the reverse direction. The valve 46 is prevented from undue displacement by a screw plug 49.

To prevent damage occurring by reason of excessive pressure developing in the cylinders 28 and 29, each piston is provided with relief ducts 50 and 51 affording communication between the cylinders and the recuperator chamber. Each duct 50 is controlled by a valve 52 which is pressed on to its seat by a spring 53 held in place by a screw 54 to which further reference will be made later. Thus before excessive pressure develops, the valve 52 will be forced off its seat and allow the passage of fluid from the cylinder into the recuperator chamber. A continuation of the duct 51, made during manufacture, is closed by a screw plug 55.

Inside the casing 15 there is splined or otherwise attached to the rock shaft 21 a built-up rock arm for transmitting the shock to, and damping effort from, the pistons. This rock arm comprises a barrel 56 (see particularly Figure 2) upon the ends of which two parallel plates 57 and 58 are secured, say by welding or by copper brazing in a hydrogen atmosphere. The upper ends of the plates 57 and 58 extend above the barrel 56 to form a groove between them, the purpose of which is described below. These plates 57 and 58 reach down to the pistons 30 and 31 and are provided with bosses 59 on their inner faces. These bosses are shown as being made separately from the plates 57 and 58 and as being secured in place by having their stems 60 rigidly received in holes in the plates. The bosses 59 are intended to transmit the oscillatory movement of the rock arm to the pistons and conversely to transmit the reciprocatory movement of the pistons to the rock arm and it will be appreciated that during these two movements the bosses will have to rise and fall with respect to the pistons. It is desirable to minimise the effects of any wear on the working parts which may thus be caused. For this purpose the inner faces of the pistons are provided with guide plates 61 which are held in place by screws 48 and the aforesaid screws 54 which lie opposite to the bosses 59. Interposed between the guide plates 61 and the bosses 59 are bearing members which rock on the bosses and which are each in two separated portions 62 and 63 (see particularly Figure 5). From this figure it will be seen that the members 62 and 63 in a pair are located on opposite sides of a boss 59 but do not completely surround it. They also have flatted surfaces 64 which engage the guide plates 61. It will be remembered that the two pistons 30 and 31 are pressed towards each other by the spring 36, and thus by virtue of the engagement between the flats 64 and the guide plates 61, the members 62 and 63 in a pair will be pressed towards each other on to the boss 59. Therefore as wear occurs between the members 62 and 63 and the boss 59 such wear will be taken up by the members 62 and 63 approaching each other. Figure 5 makes it clear that these members 62 and 63, when in operative position, are spaced apart from each other along their lines of separation sufficiently to permit the said wear to be taken up. Still referring more particularly to Figure 5, it will be seen that the members 62 and 63 in a pair are connected by a light spring 65 which not only serves to prevent them from falling apart when the mechanism is dismantled, but also serves to assist in the assembly of the parts. In effecting assembly, the members 62 and 63 would first of all be slipped into place on their appropriate boss 59 and then the rock arm carrying them would be forced down through the centre barrel 16 in between the pistons. Before making contact with the guide plates 61 the lower ends of the members 62 and 63 would be drawn into contact with each other by the spring 65 thus causing the flats 64 to converge downwardly. Their lower ends therefore can be easily forced between the guide plates 61 against the pressure exerted by the spring 36. When this has been effected the members 62 and 63 will have been brought into the setting shown in Figure 5.

Any endwise thrust on the rock shaft 21 has to be taken up by the casing 15. To avoid having to machine the inside of the latter for this purpose, there is provided a detachable saddle piece 66 which is received in the aforesaid groove between the plates 57 and 58 of the rock arm. The plates 57 and 58 in the manufacture and assembly of the built-up rock arm can readily be arranged to offer the requisite closeness of fit to the saddle piece to ensure that the endwise thrust is properly transmitted. As the plates 57 and 58 are not only used to transmit the endwise thrust but are also provided with wear take-up devices (described above) between them and the pistons, it will be seen that the construction will ensure that the effects of endwise thrust will not impair the proper correlation of the working parts for the efficient transmission of shock and damping effort. At its ends the saddle piece 66 is secured to the centre barrel 16 by screwed pins 67, it being housed inside the casing 15 and serving as an anchorage for the cover 17 which is secured to it by a screw 68.

In use it will be appreciated that the fluid will be forced from the cylinder 28 to the cylinder 29 and vice versa along the restricted passage between the sleeve 32 and the metering rod 42 as the rock shaft oscillates. The construction is double-acting and damping effort will be applied during turning of the rock arm in both directions. If a vacuum develops in either cylinder due to leakage of fluid, fluid will automatically be drawn into that cylinder from the recuperator chamber and excessive pressure will not be able to develop in either of the cylinders because of the relief valves 52. The metering rod can be readily detached without dismantling the whole of the parts of the shock absorber. For instance, it may be desired to fit a different metering rod in order to change the value of the shock absorber.

Figure 7:
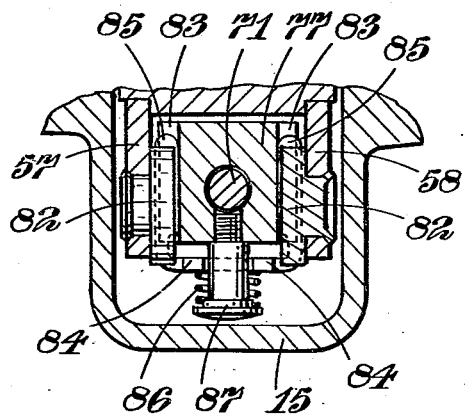
Figure 7 is a detail vertical cross-section on the line 7—7 of Figure 6.
Figure 8:
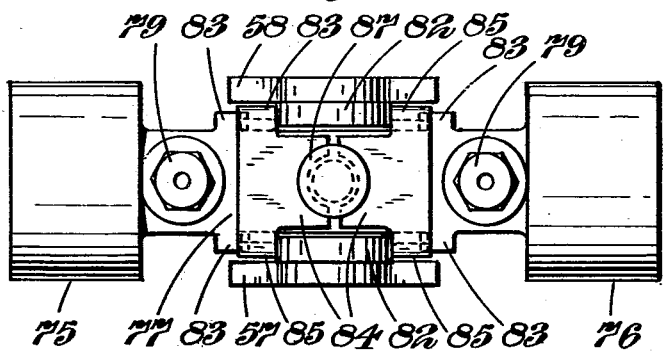
Figure 8 is an under-plan of the pistons and certain associated parts shown in Figures 6 and 7.

Referring now to Figures 6 to 8, the double-acting construction shown therein is in some respects simpler than that shown in Figures 1 to 5 though in many respects it follows the same lines as the latter. The cylinders 69 and 70 are directly screwed into the bosses 26 and 27 reaching out from the casing 15. The pistons 75 and 76 are formed integral with the piston rod 77 and the latter is bored to afford between it and the metering rod 71 the restricted passage for the flow of fluid between the two cylinders. The bore of the pistons and piston rod is enlarged at 78 and the piston rod is transversely bored to receive hollow plugs 79 permitting wastage of fluid to be recuperated from the recuperator chamber. The bores through the plugs 79 are controlled by non-return valves 80 which are prevented from undue movement by cross-pins 81.

The connection between the rock arm and the pistons differs from that described in connection with Figures 1 to 5. The plates 57 and 58 of the rock arm carry at their lower ends bosses or rollers 82 and the piston rod 77 is formed on its front and rear faces with shoulders 83. These shoulders 83, as will be seen from Figure 6, diverge downwardly and interposed between them and the bosses or rollers 82 are wedge-shaped bearing strips which are spring-pressed in the direction to cause their taper to take up wear. The bearing strips are in pairs and each pair has a base 84 and two upstanding legs 85 which constitute the bearing strips and are interposed between the boss or roller and the shoulders 83. These legs are wedge-shaped as clearly seen in Figure 6 and each base 84 reaches towards the middle of the length of the piston so as to be engaged by a spring 86 carried by a stud 87 screwed upwardly into the piston rod. The pressure of the spring 86 tends to force the wedge-shaped bearing strips upwardly and thus take up any wear which may occur between the shoulders 83, the sides of the bearing strips and the bosses or rollers 82.

Figure 9:
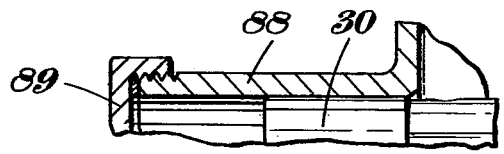
Figures 9 is a fragmentary sectional view showing a modified cylinder construction.

In the construction shown in Figure 9 the cylinders 88 are formed integral with the casing 15 of the shock absorber and they have open outer ends which are closed by end caps 89 screwed onto the exterior of the cylinders.

The construction shown in Figure 10, which obviously may be applied to any of the shock absorber assemblies illustrated in the drawings, enables a double-acting shock absorber to operate as a single-acting shock absorber. A hollow metering rod 101 is employed having near each end lateral perforations 104 and 105 constituting conduits establishing communication between its interior and exterior. Only one end of the bore of the metering rod is shown. This is controlled by a non-return valve 102 which is held in place by a light spring 103 supported by a steadying pin. It will be appreciated that the bore of the metering rod 101 provides a by-pass with respect to the restricted passage which lies between the exterior of the metering rod and the interior of the sleeve 32. This by-pass is only operative in one direction, however. The spring is of insufficient strength to offer any appreciable resistance to the passage of fluid along the bore of the metering rod towards the cylinder 28 and, therefore, the fluid will issue freely through the perforations 104, the aforesaid steadying pin being of a length which permits the valve 102 to move sufficiently far for this purpose. In other words there will be practically no damping effort when the pistons are moving towards the right. When the pistons are moving towards the left, however, fluid will reach the back of the valve 102 through the relatively large perforations 105 and will assist the spring 103 to close the valve and thus ensure that the restricted passage is not by-passed.

In the construction shown in Figure 11, which is also applicable to any of the embodiments of the shock absorber, a hollow metering rod 106 is employed having a perforation 107 near each end constituting a conduit extending through the wall of the metering rod from its interior to the interior of the cylinder 28. Slidable in the bore at the end of the metering rod is a valve 108 which is controlled from the exterior of the shock absorber, say from the driver's seat, through a connection 109 which passes through a gland packing 110 in the end cap 40. This valve 108 has one portion of the same diameter as the bore of the metering rod 106 and a plurality of smaller portions. Three, numbered respectively 111, 112 and 113 are shown. The valve 108 is intended to be moved lengthwise along the bore of the metering rod so as to position its different sized portions opposite to the mouth of the conduit 107. When the full diameter of the valve is opposite the conduit 107 the latter will be closed and there will be no by-pass provided for the restricted passage. The shock absorber will therefore be fully double-acting. As, however, the portions 111, 112 and 113 are brought opposite to the conduit 107 so the by-passing effect will be provided to different degrees and in consequence the damping value of the shock absorber will be varied.

In the construction shown in Figure 12 there are two pistons 30 and 31 mounted upon a single sleeve 32 and intended to reciprocate each in its own cylinder as shown in Figure 1.

A sealing member 117 with a spherical face towards its left as seen in Figure 12 is arranged to bear on a correspondingly shaped edge of the rim on the piston 31. The sealing member 117 is maintained pressed in sealing position by a spring 36 as in the the construction shown in Figure 1.

In the construction shown in Figure 13 the cylinders 118 and 119 are secured to the casing 15 by studs 120 passing through abutting flanges. To seal the right-hand end of the sleeve, the piston 31 is provided with a cylindrical bore to receive a packing 123 whereof the outer end is conical and receives a correspondingly-shaped pressure member 124 which is urged into sealing position by the spring 36.

It is to be understood that the invention is not restricted to the precise constructional details set forth.

Although, the various embodiments of the invention which are illustrated in the drawings include unitary double-headed pistons and built-up piston assemblies comprising relatively moveable piston elements connected by hollow sleeves, it is obvious that so far as the generic nature of the slidable piston arrangement is concerned, especially with relation to the accessory disclosures in Figures 10 and 11, the double piston arrangement may be designated as a piston unit. In the case of the embodiment shown in Figure 6, the restricted passage lies between the metering rod surface and the inner surface of the integral central portion or piston rod 77. In the case of the embodiment illustrated in Figure 1, this restricted passage lies between the adjacent surfaces of the metering rod and the sleeve 32, which latter element forms a part of the piston unit.

I claim:

1. In a shock absorber in which fluid friction is employed for damping, the combination of a casing embodying two fluid containers, a piston reciprocable in one of said containers and having a perforation extending through it from end to end, a metering rod enclosed within said casing, which rod reaches into said perforation in such manner that the piston reciprocates along the metering rod, the opposed surfaces of which perforation and metering rod provide between them a restricted passage connecting the said fluid containers, through which passage the fluid is forced by the said piston, detachable caps on the casing one opposite each end of the metering rod and means whereby both of said caps are secured to said rod to be tied together by the latter.

2. In a shock absorber in which fluid friction is employed for damping, the combination of two fluid containers, a piston reciprocable in one of said containers and having a perforation extending through it from end to end, a metering rod which reaches into said perforation in such manner that the piston reciprocates along the metering rod, a sleeve interposed between the metering rod and the perforation in the piston in such manner that the opposed surfaces of the sleeve and metering rod provide between them a restricted passage connecting the said fluid containers, through which passage the fluid is forced by the said piston, means for securing the sleeve to the piston so that the sleeve shall move with the latter, and a seal to preclude the passage of fluid between the sleeve and the piston.

3. In a shock absorber in which the fluid friction is employed for damping, the combination of two fluid containers, a piston reciprocable in one of said containers and having a perforation extending through it from end to end, a metering rod which reaches into said perforation in such manner that the piston reciprocates along the metering rod, a sleeve; interposed between the metering rod and the perforation in the piston in such manner that the opposed surfaces of the sleeve and metering rod provide between them a restricted passage connecting the said fluid containers, through which passage the fluid is forced by the said piston, means for securing the sleeve to the piston so that the sleeve shall move with the latter, and a seal at each end of the sleeve to preclude the passage of fluid between the sleeve and the piston.

4. In a shock absorber in which fluid friction is employed for damping, the combination of two fluid containers, two piston heads, one reciprocable in each container, and each piston head having a perforation extending through it from end to end, a metering rod which reaches into the perforations in such manner that the piston heads reciprocate along the metering rod, a single sleeve interposed between the metering rod and the perforations in the piston heads in such manner that the opposed surfaces of the sleeve and the metering rod provide between them a restricted passage connecting the said fluid containers, through which passage the fluid is forced by the said piston heads, means for mounting the piston heads separately on the sleeve so that the latter shall partake of the reciprocation of the piston heads, spring means for urging the piston heads towards each other along the sleeve, and a seal to preclude the passage of fluid between the sleeve and the piston heads.

5. In a shock absorber in which fluid friction is employed for damping, the combination of two fluid containers, two piston heads, one reciprocable in each container, and each piston head having a perforation extending through it from end to end, a metering rod which reaches into the perforations in such manner that the piston heads reciprocate along the metering rod, a single sleeve interposed between the metering rod and the perforations in the piston heads in such manner that the opposed surfaces of the sleeve and the metering rod provide between them a restricted passage connecting the said fluid containers, through which passage the fluid is forced by the said piston heads, means for mounting the piston heads separately on the sleeve so that the latter shall partake of the reciprocation of the piston heads, spring means for urging the piston heads towards each other along the sleeve, and a seal controlled by the said spring means to preclude the passage of fluid between the sleeve and the piston heads.

6. In a shock absorber in which fluid friction is employed for damping, the combination of two fluid containers, two piston heads, one reciprocable in each container, and each piston head having a perforation extending through it from end to end, a metering rod which reaches into the perforations in such manner that the piston heads reciprocates along the metering rod, a single sleeve interposed between the metering rod and the perforations in the piston heads in such manner that the opposed surfaces of the sleeve and the metering rod provide between them a restricted passage connecting the said fluid containers, through which passage the fluid is forced by the said piston heads, means for mounting the piston heads separately on the sleeve so that the latter shall partake of the reciprocation of the piston heads, spring means for urging the piston heads towards each other along the sleeve, and tapered enlargements at the ends of the sleeve to take a close seating against the rims of the perforations in the piston heads and preclude the passage of fluid between the sleeve and the piston heads.

7. In a shock absorber in which fluid friction is employed for damping, the combination of a casing embodying two fluid containers, a piston reciprocable in one of said containers and having a perforation extending through it from end to end, a metering rod enclosed within said casing, which rod reaches into said perforation in such manner that the piston reciprocates along the metering rod, the opposed surfaces of which perforation and metering rod provide between them a restricted passage connecting the said fluid containers, through which passage the fluid is forced by the said piston, a rock shaft which transmits the shock and the damping effort, means for mounting said shaft in the casing, a rock arm comprising two opposed plates which straddle the piston, bosses on the inner faces of said plates, means for mounting said arm on the rock shaft inside the casing, guides lying transversely of the direction of reciprocation of the piston, means for mounting said guides on the piston to reciprocate with it and in such a position as to be engaged by the bosses on the rock arm and to maintain the engagement during the rotary movement of the arm and the corresponding reciprocatory movement of the piston, bearing members embracing but movable relatively to said bosses and interposed between the rock arm and the guides, and spring means constantly urging said bearing members to take up wear.

8. In a shock absorber in which fluid friction is employed for damping, the combination of a casing embodying two fluid containers, two piston heads, one reciprocable in each container, and each piston head having a perforation extending through it from end to end, a metering rod enclosed within said casing, which rod reaches into the perforations in such manner that the piston heads reciprocate along the metering rod, a single sleeve interposed between the metering rod and the perforations in the piston heads in such manner that the opposed surfaces of the sleeve and the metering rod provide between them a restricted passage connecting the said fluid containers, through which passage the fluid is forced by the said piston heads, means for mounting the piston heads separately on the sleeve so that the latter shall partake of the reciprocation of the piston heads, spring means for urging the piston heads towards each other along the sleeve, a seal to preclude the passage of fluid between the sleeve and the piston heads, a rock shaft which transmits the shock and the damping effort, means for mounting said shaft in the casing, a rock arm, bosses on said rock arm, means for mounting said arm on the rock shaft inside the casing, guides lying transversely of the direction of reciprocation of the piston heads, means for mounting said guides on the piston heads to reciprocate with them and in such a position as to be engaged by the bosses on the rock arm and to maintain the engagement during the rotary movement of the arm and the corresponding reciprocatory movement of the piston heads, and bearing members, rockable on the said bosses and interposed between them and the guides, which bearing members are each in two separated portions constituting a pair and located on opposite sides of but not completely surrounding the boss to which they are appropriated, which portions in a pair are pressed towards each other onto the boss by the said spring pressure on the piston heads, and when in operative position are spaced from each other along their lines of separation sufficiently to permit the wear between them and the bosses to be taken up by the bearing member portions in a pair approaching each other.

9. In a shock absorber in which fluid friction is employed for damping, the combination of a casing embodying two fluid containers, two piston heads, one reciprocable in each container, and each piston head having a perforation extending through it from end to end, a metering rod enclosed within said casing, which rod reaches into the perforations in such manner that the piston heads reciprocate along the metering rod, a single sleeve interposed between the metering rod and the perforations in the piston heads in such manner that the opposed surfaces of the sleeve and the metering rod provide between them a restricted passage connecting the said fluid containers, through which passage the fluid is forced by the said piston heads, means for mounting the piston heads separately on the sleeve so that the latter shall partake of the reciprocation of the piston heads, spring means for urging the piston heads towards each other along the sleeve, a seal to preclude the passage of fluid between the sleeve and the piston heads, a rock shaft which transmits the shock and the damping effort, means for mounting said shaft in the casing, a rock arm, bosses on said rock arm, means for mounting said arm on the rock shaft inside the casing, guides lying transversely of the direction of reciprocation of the piston heads, means for mounting said guides on the piston heads to reciprocate with them and in such a position as to be engaged by the bosses on the rock arm and to maintain the engagement during the rotary movement of the arm and the corresponding reciprocatory movement of the piston heads, bearing members, rockable on the said bosses and interposed between them and the guides, which bearing members are each in two separated portions constituting a pair and located on opposite sides of but not completely surrounding the boss to which they are appropriated, which portions in a pair are pressed towards each other onto the boss by the said spring pressure on the piston heads, and when in operative position are spaced from each other along their lines of separation sufficiently to permit the wear between them and the bosses to be taken up by the bearing member portions in a pair approaching each other, and a light spring connecting the two bearing member portions in a pair, for the purpose specified.

10. In a shock absorber in which fluid friction is employed for damping, the combination of a casing embodying two fluid containers, a piston reciprocable in one of said containers and having a perforation extending through it from end to end, a metering rod enclosed within said casing, which rod reaches into said perforation in such manner that the piston reciprocates along the metering rod, the opposed surfaces of which perforation and metering rod provide between them a restricted passage connecting the said fluid containers, through which passage the fluid is forced by the said piston, a rock shaft which transmits the shock and the damping effort, means for mounting said shaft in the casing, a grooved rock arm, means for mounting said arm on the rock shaft inside the casing, means for maintaining engagement between the rock arm and the piston during the rotary movement of the arm and the corresponding reciprocatory movement of the piston, a saddle piece, and means for detachably securing said saddle piece to said casing so as to lie transversely of the rock shaft and reaching into the groove in the rock arm and thus transmit to the casing endwise thrust on the rock shaft.

11. In a shock absorber in which fluid friction is employed for damping, the combination of a casing embodying two fluid containers, a piston reciprocable in one of said containers and having a perforation extending through it from end to end, a metering rod enclosed within said casing, which rod reaches into said perforation in such manner that the piston reciprocates along the metering rod, the opposed surfaces of which perforation and metering rod provide between them a restricted passage connecting the said fluid containers, through which passage the fluid is forced by the said piston, a rock shaft which transmits the shock and the damping effort, means for mounting said shaft in the casing, a grooved rock arm, means for mounting said arm on the rock shaft inside the casing, means for maintaining engagement between the rock arm and the piston during the rotary movement of the arm and the corresponding reciprocatory movement of the piston, a saddle piece, means for detachably mounting said saddle piece inside said casing so as to lie transversely of the rock shaft and reaching into the groove in the rock arm and thus transmit to the casing endwise thrust on the rock shaft, a cover for part of the interior of the casing, which cover lies immediately over the saddle piece, and means for anchoring said cover to the saddle piece.

12. In a shock absorber in which fluid friction is employed for damping, the combination of a casing embodying two fluid containers, a piston reciprocable in one of said containers and having a perforation extending through it from end to end, a metering rod enclosed within said casing, which rod reaches into said perforation in such manner that the piston reciprocates along the metering rod, the opposed surfaces of which perforation and metering rod provide between them a restricted passage connecting the said fluid containers, through which passage the fluid is forced by the said piston, a rock shaft which transmits the shock and the damping effort, means for mounting said shaft in the casing, a barrel, means for mounting said barrel on the rock shaft inside the casing, two parallel plates together constituting with the barrel a rock arm, which plates are located one at each end of said barrel, means for securing said plates to the barrel in such manner that they reach out towards the piston, guides lying transversely of the direction of reciprocation of the piston, bosses on the inner faces of said plates to engage said guides, and means for mounting said guides on the piston to reciprocate with it and in such a position as to be engaged by the bosses on the said plates and to maintain the engagement during the rotary movement of the plates and the corresponding reciprocatory movement of the piston.

13. In a shock absorber in which fluid friction is employed for damping, the combination of a casing embodying two endwise aligned piston cylinders, a piston with two piston heads reciprocable with one piston head in each cylinder and having a perforation extending through it from end to end, a metering rod enclosed within said casing, which rod reaches into said perforation in such manner that the piston reciprocates along the metering rod, the opposed surfaces of which perforation and metering rod provide between them a restricted passage connecting the said cylinders, through which passage the fluid is forced by the piston heads, detachable end caps constituting parts of said piston cylinders and located one opposite each end of the metering rod and means whereby both of said caps are secured to said rod to be tied together by the latter.

14. In a shock absorber in which fluid friction is employed for damping, the combination of two fluid containers, two piston heads, one reciprocable in each container, and each piston head having a perforation extending through it from end to end, a metering rod which reaches into the perforations in such manner that the piston heads reciprocate along the metering rod, a single sleeve interposed between the metering rod and the perforations in the piston heads in such manner that the part of the sleeve between the end portions thereof is not a close fit in the said perforations and the opposed surfaces of the sleeve and the metering rod provide between them a restricted passage connecting the said fluid containers, through which passage the fluid is forced by the said piston heads, means for mounting the piston heads separately on the sleeve so that the latter shall partake of the reciprocation of the piston heads, springs means for urging the piston heads toward each other along the sleeve, and tapered enlargements at the ends of the sleeve to take a close seating against the rims of the perforations in the piston heads and preclude the passage of fluid between the sleeve and the piston heads.

15. In a shock absorber in which fluid friction is employed for damping, the combination of two fluid containers, a piston unit embodying two piston heads, one of said heads reciprocable in each container, and said piston unit having a perforation extending through it from end to end, a hollow metering rod which reaches into the perforation in such manner that the piston unit reciprocates along the metering rod, the opposed surfaces of which perforation and metering rod provide between them a restricted passage connecting the said fluid containers, through which passage the fluid is forced by the said piston heads, and the interior of which metering rod constitutes a by-pass for said restricted passage, which hollow metering rod is formed near one end with a conduit extending through its wall from the interior to the exterior of the rod, a valve for controlling flow through said conduit, said valve comprising a pin having stepped cylindrical shouldered portions of different diameters, said pin being longitudinally slidably mounted within the end of said rod and having its stepped portion extending toward the mouth of said conduit, and means operable at will from without said shock absorber for slidably reciprocating said valve longitudinally to bring a different sized portion opposite to said conduit mouth.

ERNEST WILLIAM JOHNSON.